(12) United States Patent
Cocetta

(10) Patent No.: US 6,414,472 B1
(45) Date of Patent: Jul. 2, 2002

(54) ELECTRONIC SWITCHING REGULATOR CIRCUIT FOR PRODUCING A REFERENCE VOLTAGE VARIABLE WITH TEMPERATURE

(75) Inventor: Franco Cocetta, Premariacco (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/943,096

(22) Filed: Aug. 30, 2001

(30) Foreign Application Priority Data

Aug. 31, 2000 (EP) .............................................. 00830592

(51) Int. Cl.[7] ................................................. G05F 3/20
(52) U.S. Cl. ....................................... 323/316; 323/314
(58) Field of Search ................................. 323/316, 315, 323/313, 268, 269, 314, 907

(56) References Cited

U.S. PATENT DOCUMENTS 5,063,342 A * 11/1991 Hughes et al. ............... 323/315
5,309,083 A    5/1994 Pierret et al. ................ 323/313
5,703,476 A   12/1997 Merlo et al. ................. 323/313
6,232,757 B1 * 5/2001 Afghahi et al. ............. 323/314

FOREIGN PATENT DOCUMENTS

EP    0751451   1/1997   ............. G05F/1/46
WO   91/00635   1/1991   ............. H02J/7/14

* cited by examiner

*Primary Examiner*—Shawn Riley
(74) *Attorney, Agent, or Firm*—Lisa K. Jorgenson; Allen, Dyer, Doppelt, Milbrath & Gilchrist, P.A.

(57) ABSTRACT

A switching regulator circuit produces a varying reference voltage with temperature and includes at least one band-gap generator for supplying a power stage through an error amplifier and a comparator. The error amplifier is also supplied a regulated voltage which may be produced by the regulator itself. The at least one band-gap generator includes a plurality of band-gap generators being supplied by the regulated voltage and input a fraction of the regulated voltage through a voltage divider. The respective outputs of the band-gap generators are connected to a logic network which has an output connected to the power stage. The error amplifier and comparator may be included within each respective band-gap generator.

34 Claims, 4 Drawing Sheets

ELECTRONIC SWITCHING REGULATOR CIRCUIT FOR PRODUCING A REFERENCE VOLTAGE VARIABLE WITH TEMPERATURE

FIELD OF THE INVENTION

The invention relates to an electronic regulator circuit producing a reference voltage that varies with temperature. In particular, the regulator circuit includes a band-gap generator for supplying a power stage through an error amplifier and a comparator, with the error amplifier also receiving a regulated voltage. More particularly though not exclusively, the invention relates to a voltage regulator for automotive applications, and the following description is made with reference to this field of application for convenience of illustration.

BACKGROUND OF THE INVENTION

As it is well known in this technical field, for voltage regulators to be used in motor alternators, a battery regulated voltage has to follow a specific pattern with temperature variations. Usually, this pattern can be represented by a polygonal curve of voltage plotted against temperature which changes in slope at predetermined breakpoints, as shown in FIG. 1, where the curve includes at least three segments.

This dependence of the voltage regulator on temperature is usually established inside the regulator circuit, using a reference which obeys a desired law, for instance as shown in FIG. 1, but is scaled in value by a factor K set by a voltage divider, for example.

More particularly, a conventional voltage regulator 1 is shown by way of example in FIG. 2, which uses a supply voltage VGO derived from an external source. Regulators of the kind shown in FIG. 2 commonly equip automobile vehicles having an alternator associated with their power plant. The alternator output voltage VGO, although much affected by noise, is often used to supply the less critical portions of the vehicle's own electronic circuitry. These circuit portions, e.g., digital circuits and power stages, are indeed the most consumption-intensive ones.

The regulator 1 includes a band-gap regulator block 2 intended for generating a stable reference signal Vr from a supply line 3 presenting the voltage VGO. One example of a band-gap circuit is disclosed in U.S. Pat. No. 5,309,083 to Valeo Equipments Electriques.

The reference voltage signal Vr, also referred to as the set point signal, is supplied to respective inverting (−) inputs of an error amplifier 4 and an output comparator stage 5, when regulation is non-linear and provided through a relay. When regulation is instead achieved by a PWM signal, the inverting input of the comparator 5 will receive the PWM signal.

In either cases, both the error amplifier 4 and the comparator 5 are supplied by a voltage VGO line 3, and the output of the error amplifier 4 is connected to the non-inverting (+) input of the output comparator stage 5. A voltage divider 6 is provided between a SENSE line and a ground voltage reference GND. A voltage value Vs to be controlled is present on the SENSE line.

The signal Vs on the SENSE line is equal to K Vr, where K is the partition factor. For example, if the divider 6 is of a resistive type, a first resistor of unitary resistance is connected in series to a resistor of resistance (K−1). The interconnection node X between these resistors is connected to the non-inverting (+) input of the error amplifier 4 to deliver a voltage value given by the ratio Vs/K.

A regulation loop, which is not shown because it is conventional, will make the value of the signal Vs on the SENSE line K times greater than the reference voltage signal Vr. The regulator structure 1 described with reference to FIG. 2 may be operated in different regulating modes.

For example, the regulator 1 may be operated in a switching mode, a PWM (Pulse Width Modulation) mode, or in a relay type of non-linear mode. Such a structure is described, for example, in U.S. Pat. No. 5,703,476 assigned to the assignee of the present invention, and the entire contents of which are incorporated herein by reference.

Although in many ways advantageous and substantially achieving its objective, the above regulator structure is inadequate to allow a simulation of the curve of FIG. 1 to be obtained in any comparatively simple manner, with respect to all of the above regulating modes. In addition, none of the above-outlined approaches are economically advantageous, from both standpoints of power consumption and circuit complexity.

SUMMARY OF THE INVENTION

An object of this invention is to provide an integrated electronic circuit for regulating a reference voltage that varies with temperature. The integrated electronic circuit has structural and functional features such that it can be supplied by a voltage produced inside the circuit itself, thereby reducing the overall power consumption and improving the stability features of the generated reference voltage signal Vr.

The principle on which this invention stands is one of using, as a supply voltage, the controlled signal Vr of the SENSE line produced by the regulator circuit itself, and applying this supply voltage to a plurality of band-gap regulators substantially provided in a number equal to the number of segments of a polygonal curve to be tracked by the regulator characteristics.

Based on this principle, an object of the invention is achieved by providing an electronic regulator circuit that comprises a voltage divider having an input for receiving a regulated voltage, and an output for providing a divided regulated voltage. A plurality of band-gap generators are connected to the voltage divider, with each band-gap generator being supplied by the regulated voltage and having an input for receiving the divided regulated voltage. In addition, each band-gap generator may have an error amplifier and a comparator incorporated therein. The electronic regulator circuit may further include a logic network connected to a respective output of each band-gap generator, and an output of the logic circuit may be connected to a power stage.

The regulator circuit may further include a regulating loop for producing the regulated voltage. The plurality of band-gap regulators are substantially a same number as there are segments of a polygonal curve representing a desired pattern of the reference voltage as the temperature varies.

Each band-gap generator preferably comprises a current mirror having a first circuit leg and a second circuit leg, with the first and second circuit legs independently connecting a regulated voltage supply line to ground. The first circuit leg preferably comprises a transistor receiving the divided regulated voltage, and the second circuit leg preferably includes an output for connecting to the logic network.

Each band-gap generator preferably further comprises an inverter having an output connected to the logic network, and the plurality of band-gap generators are modularly connected in a circuit structure having an input connected to the voltage divider.

BRIEF DESCRIPTION OF THE DRAWINGS

The features and advantages of the circuit and the method according to the invention will be apparent from the following description of embodiments thereof, given by way of non-limiting examples with reference to the accompanying drawings. In the drawings.

DETAILED DESCRIPTION OF THE PREFERRED EMBODIMENT

Figure 3:
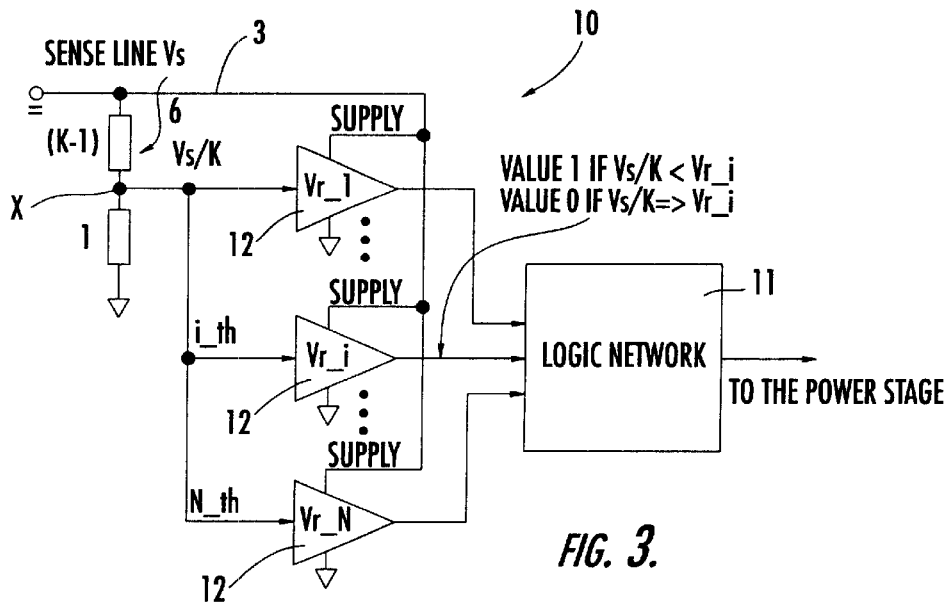
FIG. 3 is a schematic block diagram of a voltage regulator according to the present invention.

Referring to the drawing views and in particular to the scheme of FIG. 3, an integrated electronic circuit according to the invention for regulating a reference voltage Vr which varies with temperature is generally shown at 10 in schematic form, and is specifically useful with switching regulators.

The circuit 10 is a regulator intended for producing a control voltage Vc to a conventional power stage, not shown, which would be connected downstream of the regulator. The circuit 10 comprises a band-gap generator 2 producing a voltage Vc to be supplied to a power stage through an error amplifier 4 and a comparator 5. The error amplifier 4 is also supplied a regulated voltage Vs, and more specifically, a fraction thereof is picked up through the voltage divider 6. The regulated voltage Vs presented on the SENSE line can be produced by the regulator circuit itself through a regulating loop.

Figure 2:
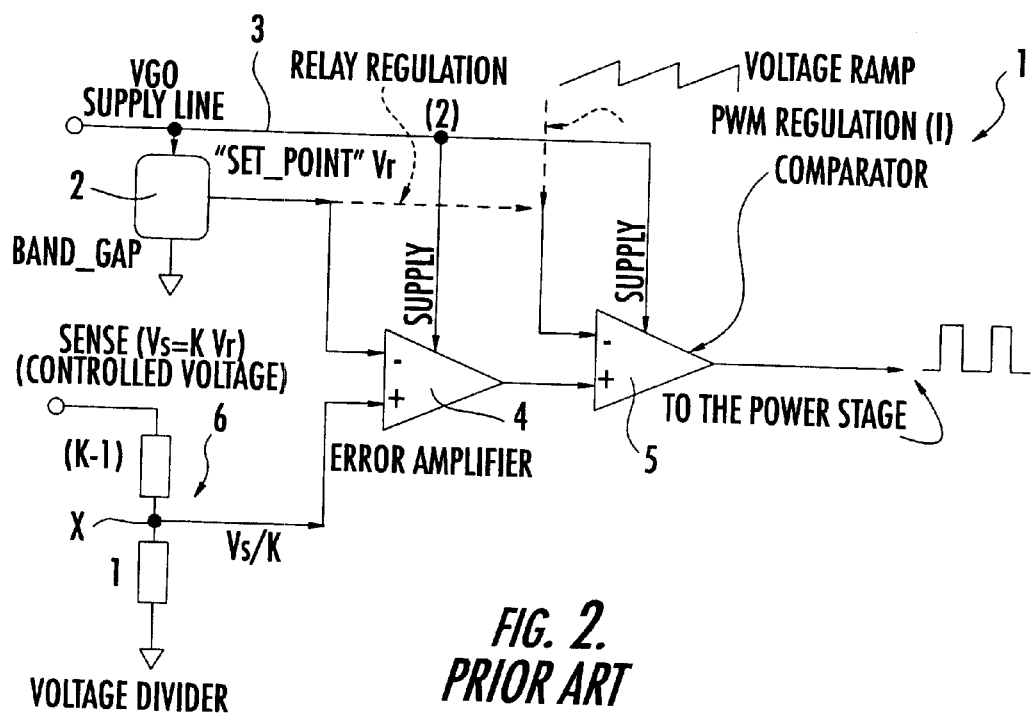
FIG. 2 is a schematic block diagram of a voltage regulator for automotive applications according to the prior art.

Based on the structure shown in FIG. 2, this invention gives consideration to the fact that a switch mode regulation essentially causes the comparator 5 to generate a digital signal obtained from the signal Vs, the latter being the controlled signal. In essence, the information output from the comparator 5 is a logic signal to turn on or off a power actuator stage connected downstream of the comparator 5. The output signal will be a logic value 1 if the signal Vs/K is lower than the set-point signal Vr, and it will be a logic value 0 if the signal Vs/K is greater that the set-point signal.

Figure 1:
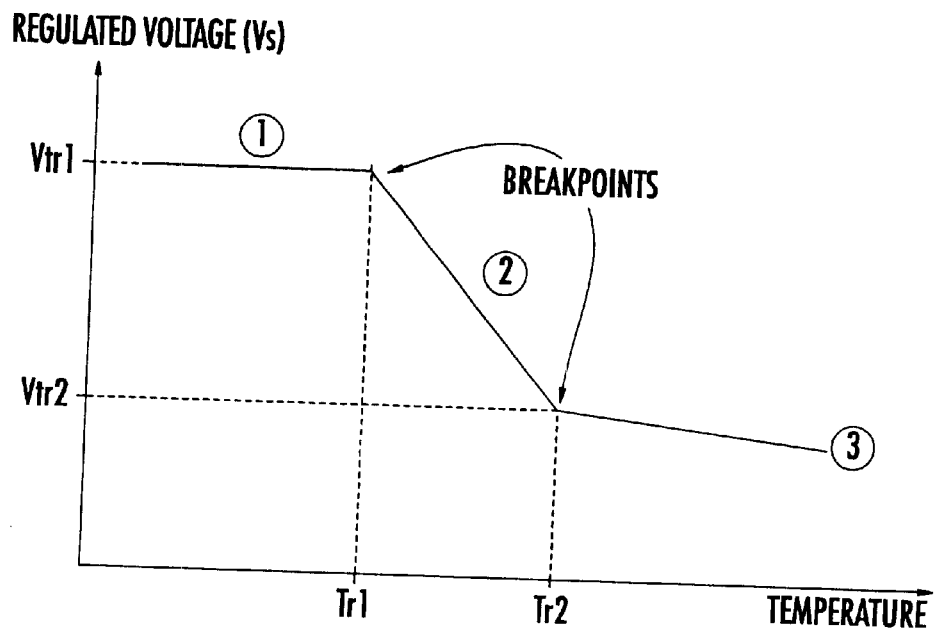
FIG. 1 is a plot of voltage vs. temperature showing the polygonal curve of a regulated voltage based upon temperature variations according to the prior art.

This simplification is due to the following stipulations:

1) the set-point signal Vr is not processed in the analog mode to create N segments of the polygonal curve shown in FIG. 1 and then digitized the signal Vs of the SENSE line, as in the prior art; on the contrary, the digitizing step is shifted as far upstream as possible, that is, as close to the generation of the set-point signal Vr as possible;

2) a specific (Vr_th) band-gap reference is provided for each straight segment of the polygonal curve in FIG. 1. Each of these N band-gap blocks shown in FIG. 3 are the same number as the N segments of the polygonal curve in FIG. 1, has a logic output of 1 if the ratio Vs/K is lower than the Vr_th reference, and a logic output of 0 if the rate Vs/K is greater then the Vr_th reference. Accordingly, the signal Vs of the SENSE line will be simultaneously digitized as the Vr_th reference is generated, which is related to the i-th segment of the polygonal curve in FIG. 1;

3) optimum performances can thus be obtained for the regulator 10 by having these N reference blocks, Vr_th, directly supplied by the signal Vs to be controlled; and 4) the overall regulation will be given by a logic function, e.g., a Boolean function, among the N logic inputs provided by the reference blocks under 2) above; the output of a related logic network 11 will drive a switching power stage connected downstream of the regulator 10.

The above considerations have their fulfillment in the block diagram of FIG. 3. For the regulator circuit 10 to operate correctly, it is important for the logic signals therein to be suitably handled, as will be explained below.

The regulator 10 includes a plurality of band-gap blocks 12, each intended to produce a corresponding voltage signal Vr-i to be applied to the logic network 11. Each block 12 is input a signal taken from the interconnection node X of the resistive divider 6. The output from each block 12 carries a logic value of 1 if Vs/K<Vr-i, or a value of 0 if Vs/K≧Vr-i. Advantageously in this invention, each block 12 is powered from the SENSE line, wherein the voltage signal Vs to be controlled is presented.

Figure 4:
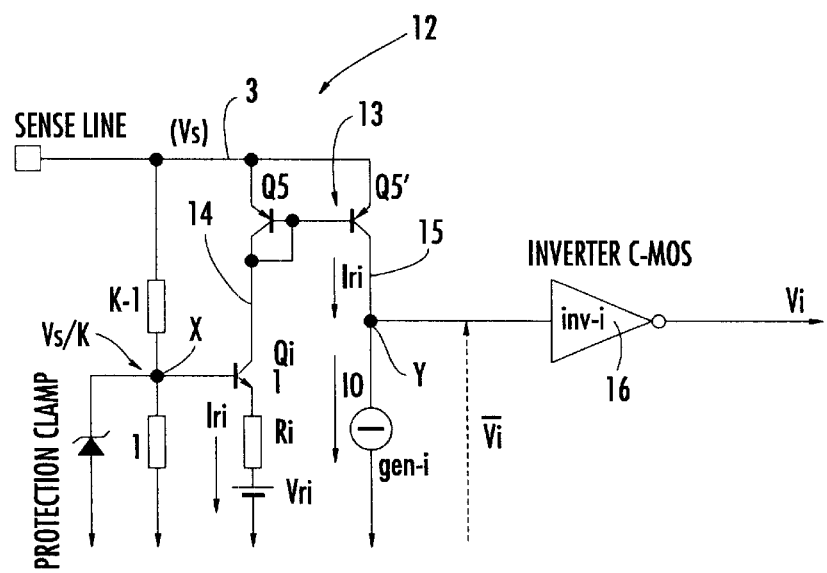
FIG. 4 is a detailed schematic diagram of one of the band-gap blocks illustrated in FIG. 3.

The basic structure of each block 12 with base Vr-i is shown in FIG. 4. The example of FIG. 4 is but one of the practical circuit embodiments which are possible for the scheme of FIG. 3, and is in no way limiting.

A current generator gen-i represents the low-side configuration output of a mirror 13 of a current Iri. This generator is set to a reference value I0. This current reference value I0 is from a generator of the ΔVbe type. In essence, the current I0 is given by:

$$I0 = \Delta Vbe/R0 \tag{1}$$

In other words, the current I0 is obtained by selecting the resistance of a resistor R0 to which a voltage drop ΔVbe is applied.

The current mirror 13 comprises a pair of bipolar transistors Q5 and Q5' which are supplied from the SENSE line and inserted in a first leg 14 and a second leg 15 of the mirror, respectively. A first transistor Q5 of the transistors is diode-connected to a transistor Qi in the leg 14. This transistor Qi has a control terminal, i.e., its base terminal, connected to the node X of the resistive divider 6. A conduction terminal of the transistor Qi is connected to ground through a resistor Ri and a voltage generator Vri.

Connected between the second transistor Q5' of the mirror 13 and the current generator I0 is an output node Y from which the voltage signal Vi can be taken via an inverter 16. It is preferred, though not absolutely necessary, to arrange for the voltage drops Vbe of the transistors affected by equation (1) above to be coupled to the transistor Qi of unity area. This applies to their resistors as well.

In view of the above conditions, the threshold voltage Vi of the transistor Qi is coincident with the following value of the voltage Vs at the SENSE line:

$$Vs/K = Vri + Ri/R0 * \Delta Vbe + Vbe(Qi) \quad (2)$$

The error introduced by the base currents of the transistors has been left out of this equation for simplicity, in view that such currents are easily recovered at the expense of a small circuit complication. Thus, for simplicity, it is assumed that i=2, meaning that the second segment of the polygonal curve in FIG. 1 is to be considered.

Figure 5:
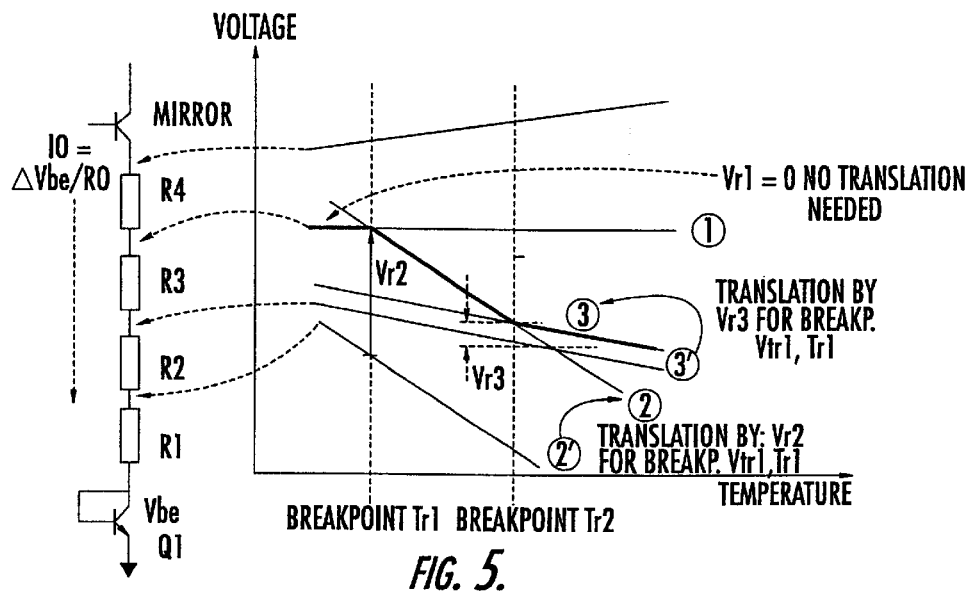
FIG. 5 is a plot of voltage vs. temperature for the circuit illustrated in FIG. 3, and as related to the detailed circuit illustrated in FIG. 4.

Equation (2) allows setting of the slope value of the regulated voltage Vs against temperature, at a given resistance R0, by appropriate selection of the resistance Ri=R2. By assigning different values to R2 and Vr2, various slope combinations can be obtained in any desired number and form. FIG. 5 graphically shows how to proceed in the instance of the segmented curve of FIG. 1. FIG. 5 shows the transistor Q connected to ground only for the convenience of illustrating the synthesis mode of the polygonal curve.

Equation (2) is implemented according to the scheme of FIG. 4, where the transistor Qi (i=2) is placed in the most useful point for the regulation that follows. The ultimate approach for obtaining a polygonal pattern as shown in FIG. 1 is therefore shown in the example of FIG. 6, which relates to the instance of N=3, that is, of three polygonal segments.

It can be appreciated that each circuit portion shown in FIG. 4 has been modularly coupled to a circuit portion of similar construction to provide a regulator 10 which includes at least three modules, or as many modules as there are polygonal segments illustrated in FIG. 1. Each module has a first circuit leg 14 which includes a transistor Qi connected by its base terminal to the node X of the resistive divider 6.

The logic signals V1, V2 and V3 at the respective output nodes Y1, Y2 and Y3 of each module indicate the state of the voltage Vs/K at the polygonal segments 1, 2 and 3 shown in FIG. 5. For example, V1 will be a logic 0 if the voltage Vs/k is located above the line 1. Otherwise, it will be a logic 1, if the voltage is located below the line 1. The same considerations would apply to V2 and V3, and for any number of polygonal segments.

Figure 7:
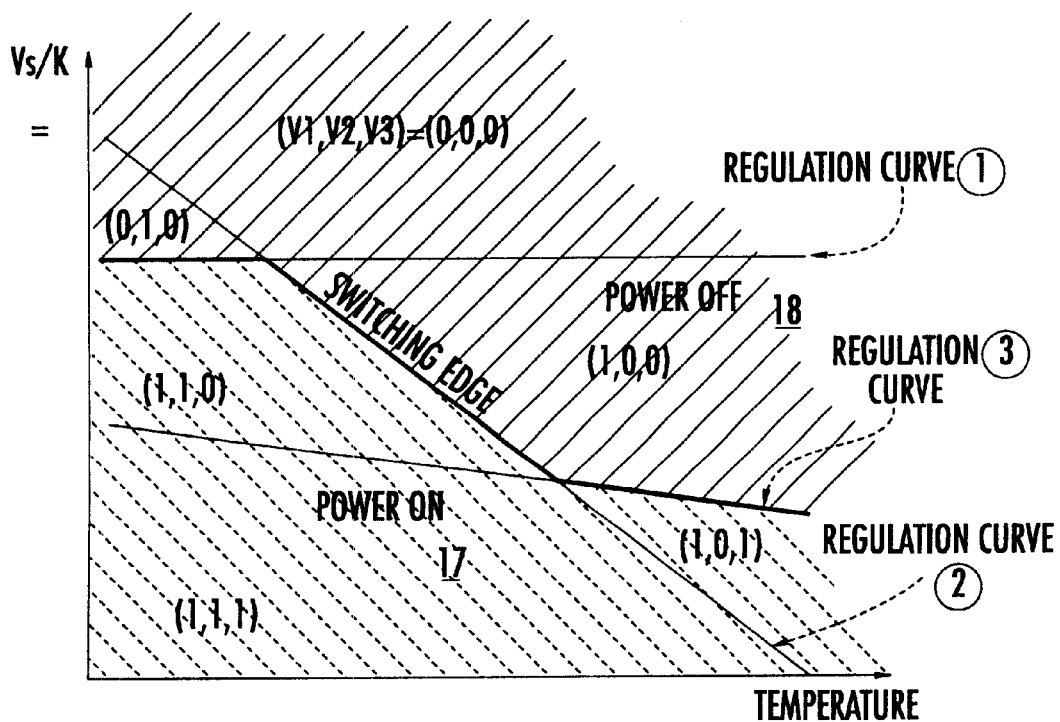
FIG. 7 is a plot summarizing operation of the logic network incorporated into the circuit of FIG. 3.

The logic network 11 can be structured with the aid of the diagram in FIG. 7. For correctly driving the power stage which is connected downstream of the regulator 10, the operational range of such a stage should be determined. Assuming the power stage to be, for example, a transistor with on/off states, the on and off areas of this transistor denoted by the numerals 17 and 18 are respectively shown in the Cartesian diagram of FIG. 7, with the polygonal curve of FIG. 1 being superimposed thereon. The logic values of the signals V1, V2 and V3 are indicated by three parenthetic digits in the areas bounded by the respective regulation curves 1, 2 and 3.

Figure 6:
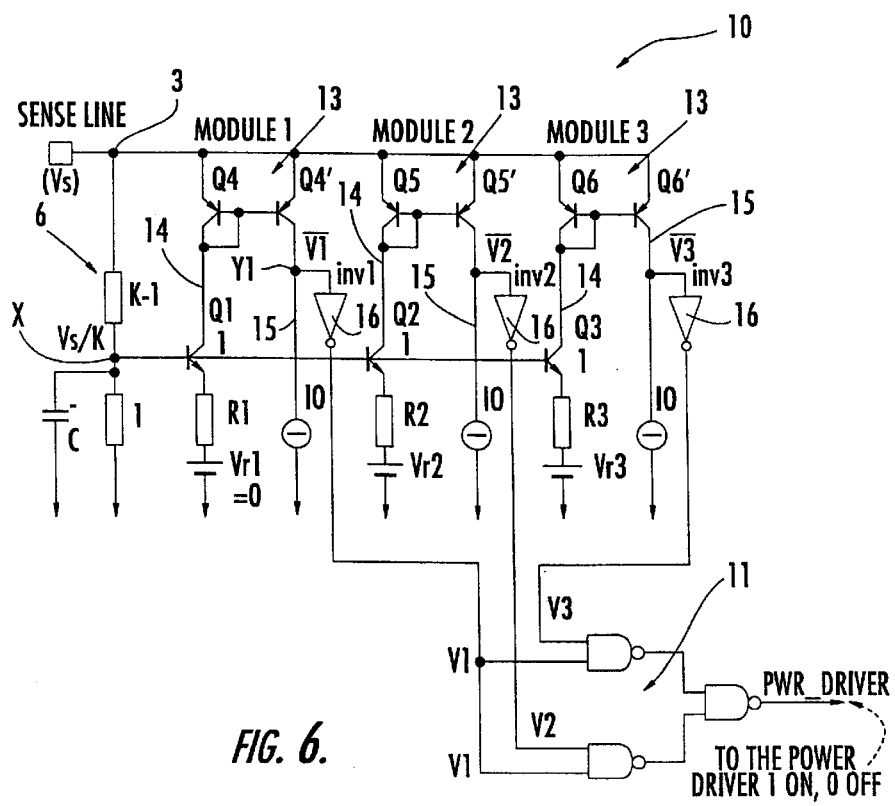
FIG. 6 is a schematic diagram of a circuit layout according to the embodiment illustrated in FIG. 4 for a regulated voltage having a linear pattern which includes at least three different slopes.

The logic network 11 connected downstream of the circuit shown in FIG. 6 has been drawn from this graph and meets the following equation:

$$PWR\_DRIVER = NAND(NAND(V1,V2),NAND(V1,V3)) \quad (3)$$

In FIG. 6, a capacitor C is connected between the node X of the divider 6 and ground GND. The dynamic function is served by this capacitor C, which is but a schematic representation of the most suitable position for inserting the dynamic properties of the regulation loop.

The voltages Vr1, Vr2 and Vr3 can be easily obtained from the current I0 in the event no other sources are available. Generation by the current I0 also allows recovery of process variations of any quantities by adjusting only a parameter, i.e., the current I0 which is dependent on the resistance R0.

Figure 8:
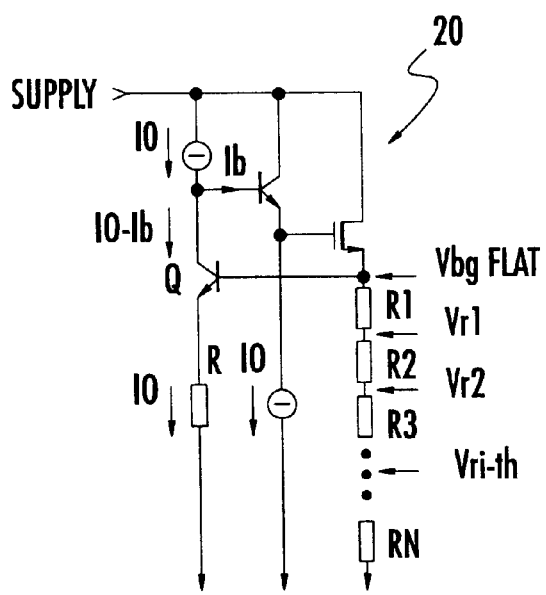
FIG. 8 shows another circuit layout of the scheme illustrated in FIG. 3.

A suitable circuit 20 for this purpose is shown in FIG. 8. This circuit 20 also allows the base current Ib to be recovered which had been ignored in equation (2). The circuit 20 comprises a series of resistors R, R1, R2, . . . Ri, . . . RN which have to be of the same type and coupled to the resistor R0.

Thus, the i-th node of the circuit 20 of FIG. 8 is the equivalent of a Thevenin voltage generator having a no-load voltage that equals the Vri-th voltage, being the translating voltage, and an equivalent series resistance that equals the Ri-th resistance of desired value, in conformity with the base circuit model of FIG. 4.

The regulator circuit 10 of this invention allows the functions listed below to be incorporated in a single comparatively straightforward modular circuit structure which were served before by separate circuit portions. These functions include:

A) the different slopes against temperature are obtained by adding a number of modules equal to the number of polygonal segments having a slope change, and are obtained by adopting a suitable logic network 11;

B) the prior art error amplifier is incorporated in the circuit of FIG. 4 as a combination of the following components: Vri, Ri, Qi and K, where suffix i may vary between 1 and N, and N is the number of polygonal segments. Thus, the voltage Vs/K is digitized at once upon comparison of the equivalent current Iri generated by the transistor Qi from Vs/K with the reference current I0. The change from Vs/k to Iri also allows the required dynamic function for regulation to be added; and C) the comparator itself is incorporated in the circuit and enables the current Iri produced by the controlled voltage Vs/K of FIG. 4 to be compared with the reference current I0 through the current mirror 13 with PNP bipolar transistors Q5, Q5'. Of course, the comparator could be implemented by any other circuits requiring no such current mirrors.

That which is claimed is:

1. An electronic regulator circuit for producing a reference voltage that varies with temperature, the electronic regulator circuit comprising:

a voltage divider having an input for receiving a regulated voltage, and an output for providing a divided regulated voltage;

a plurality of band-gap generators connected to said voltage divider, each band-gap generator being supplied by the regulated voltage and having an input for receiving the divided regulated voltage, and each band-gap generator comprising an error amplifier and a comparator connected to said error amplifier; and a logic network connected to a respective output of each band-gap generator.

2. A regulator circuit according to claim 1, wherein said logic network has an output for connecting to a power stage.

3. A regulator circuit according to claim 1, further comprising a regulating loop for producing the regulated voltage so that the regulated voltage is produced internal to the electronic regulator circuit.

4. A regulator circuit according to claim 1, wherein said plurality of band-gap regulators are substantially a same number as there are segments of a polygonal curve representing a desired pattern of the reference voltage as the temperature varies.

5. A regulator circuit according to claim 1, wherein each band-gap generator comprises a current mirror having a first circuit leg and a second circuit leg, with the first and second circuit legs connected between the regulated voltage and a reference voltage.

6. A regulator circuit according to claim 1, wherein said first circuit leg comprises a transistor receiving the divided regulated voltage; and wherein the second circuit leg includes an output for connecting to said logic network.

7. A regulator circuit according to claim 1, wherein each band-gap generator further comprises an inverter having an output connected to said logic network; and wherein said plurality of band-gap generators are modularly connected in a circuit structure having an input connected to said voltage divider.

8. A regulator circuit according to claim 1, wherein the error amplifier digitizes the divided regulated voltage which is compared to a voltage produced by a reference current.

9. A regulator circuit according to claim 1, wherein said logic network comprises a plurality of logic gates at least equal in number to a number of segments of a polygonal curve representative of a desired pattern of the reference voltage as the temperature varies.

10. An electronic regulator circuit for producing a reference voltage that varies with temperature, the electronic regulator circuit comprising:
  a voltage divider having an input for receiving a regulated voltage, and an output for providing a divided regulated voltage;
  a plurality of band-gap generators connected to said voltage divider and being substantially a same number as there are segments of a polygonal curve representing a desired pattern of the reference voltage as the temperature varies, and each band-gap generator being supplied by the regulated voltage and having an input for receiving the divided regulated voltage; and
  a logic network connected to a respective output of each band-gap generator.

11. A regulator circuit according to claim 10, wherein said logic network has an output for connecting to a power stage.

12. A regulator circuit according to claim 10, further comprising a regulating loop for producing the regulated voltage so that the regulated voltage is produced internal to the electronic regulator circuit.

13. A regulator circuit according to claim 10, wherein each band-gap generator comprises a current mirror having a first circuit leg and a second circuit leg, with the first and second circuit legs connected between the regulated voltage and a reference voltage.

14. A regulator circuit according to claim 13, wherein said first circuit leg comprises a transistor receiving the divided regulated voltage; and wherein the second circuit leg includes an output for connecting to said logic network.

15. A regulator circuit according to claim 10, wherein each band-gap generator further comprises an inverter having an output connected to said logic network; and wherein said plurality of band-gap generators are modularly connected in a circuit structure having an input connected to said voltage divider.

16. A regulator circuit according to claim 10, wherein said logic network comprises a plurality of logic gates at least equal in number to a number of segments of a polygonal curve representative of a desired pattern of the reference voltage as the temperature varies.

17. A regulator circuit according to claim 10, wherein each band-gap generator comprises a comparator.

18. A regulator circuit according to claim 10, wherein each band-gap generator comprises an error amplifier for digitizing the divided regulated voltage which is compared to a voltage produced by a reference current.

19. An alternator comprising:
  an electronic regulator circuit for producing a reference voltage that varies with temperature, said electronic regulator circuit comprising
    a voltage divider having an input for receiving a regulated voltage, and an output for providing a divided regulated voltage,
    a plurality of band-gap generators connected to said voltage divider, and each band-gap generator being supplied by the regulated voltage and having an input for receiving the divided regulated voltage, and
    a logic network connected to a respective output of each band-gap generator; and
  a power stage connected to an output of said logic circuit.

20. An alternator according to claim 19, wherein said electronic regulator circuit further comprises a regulating loop for producing the regulated voltage so that the regulated voltage is produced internal to the electronic regulator circuit.

21. An alternator according to claim 19, wherein said plurality of band-gap regulators are substantially a same number as there are segments of a polygonal curve representing a desired pattern of the reference voltage as the temperature varies.

22. An alternator according to claim 19, wherein each band-gap generator comprises a current mirror having a first circuit leg and a second circuit leg, with the first and second circuit legs connected between the regulated voltage and a reference voltage.

23. An alternator according to claim 22, wherein said first circuit leg comprises a transistor receiving the divided regulated voltage; and wherein the second circuit leg includes an output for connecting to said logic network.

24. An alternator according to claim 19, wherein each band-gap generator further comprises an inverter having an output connected to said logic network; and wherein said plurality of band-gap generators are modularly connected in a circuit structure having an input connected to said voltage divider.

25. An alternator according to claim 19, wherein said logic network comprises a plurality of logic gates at least equal in number to a number of segments of a polygonal curve representative of a desired pattern of the reference voltage as the temperature varies.

26. An alternator according to claim 19, wherein each band-gap generator comprises a comparator.

27. An alternator according to claim 19, wherein each band-gap generator comprises an error amplifier for digitizing the divided regulated voltage which is compared to a voltage produced by a reference current.

28. A method for producing a reference voltage that varies with temperature, the method comprising:
  providing a divided regulated voltage from a regulated voltage using a voltage divider;
  generating a plurality of voltages using a plurality of band-gap generators connected to the voltage divider, each band-gap generator having an input for receiving the divided regulated voltage; and
  producing the reference voltage using a logic network connected to a respective output of each band-gap generator.

29. A method according to claim 28, further comprising forming a regulating loop for producing the regulated voltage.

30. A method according to claim 28, wherein the plurality of band-gap regulators are substantially a same number as there are segments of a polygonal curve representing a desired pattern of the reference voltage as the temperature varies.

31. A method according to claim 28, wherein each band-gap generator comprises a current mirror having a first circuit leg and a second circuit leg, the first and second circuit legs connected between the regulated voltage and a reference voltage.

32. A method according to claim 31, wherein the first circuit leg comprises a transistor receiving the divided regulated voltage; and wherein the second circuit leg includes an output node for connecting to the logic network.

33. A method according to claim 28, wherein each band-gap generator further comprises an inverter; and wherein the plurality of band-gap generators are modularly connected in a circuit structure having an input connected to the voltage divider, and a plurality of respective outputs connected to the logic network through a respective inverter.

34. A method according to claim 28, wherein the logic network comprises a plurality of logic gates at least equal in number to a number of segments of a polygonal curve representative of a desired pattern of the reference voltage as temperature varies.

* * * * *